Sept. 19, 1967  S. BRANTINGSON  3,342,442
FISHING REEL

Filed Jan. 11, 1965  3 Sheets-Sheet 1

INVENTOR.
S. BRANTINGSON

Sept. 19, 1967     S. BRANTINGSON     3,342,442
FISHING REEL
Filed Jan. 11, 1965
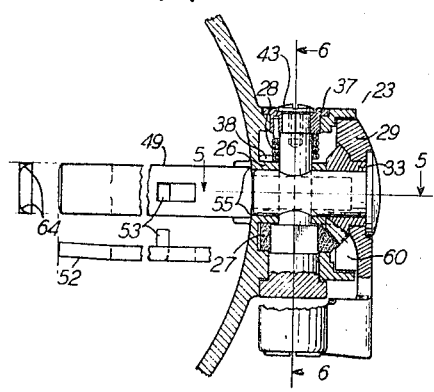
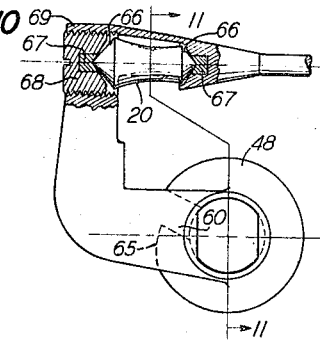
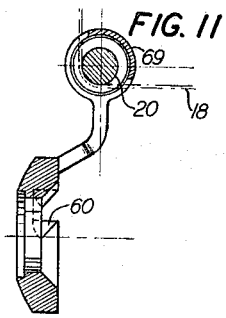
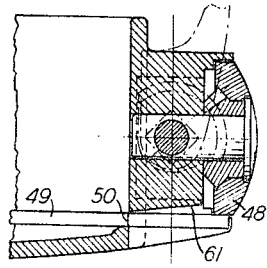
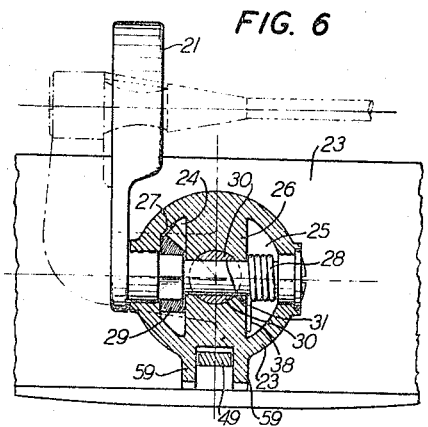
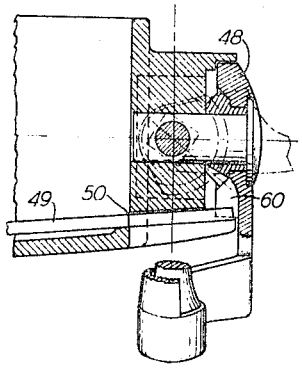
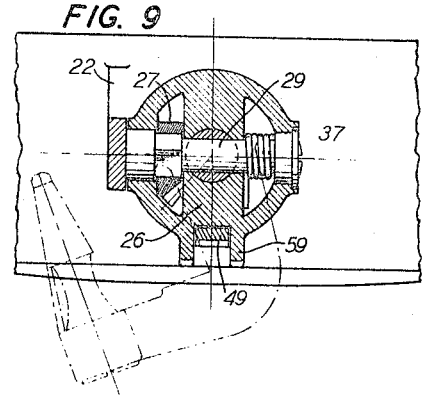
INVENTOR.
S. BRANTINGSON

United States Patent Office 3,342,442
Patented Sept. 19, 1967

3,342,442
FISHING REEL
Sigurd Brantingson, 264 White Oak Ridge Road,
Short Hills, N.J. 07078
Filed Jan. 11, 1965, Ser. No. 424,645
5 Claims. (Cl. 242—84.2)

This invention relates to fishing reels, and more particularly, to fishing line guide devices used in conjunction with spinning-type fishing reels.

One of the most popular types of fishing reels is the so-called open face spinning reel which comprises a reciprocable spool partially surrounded by a rotatable reel bowl having a movable semi-circular guide wire or "bail wire." When a cast is made, the fishing line unravels freely from the spool and is not in contact with the bail wire. Before the line is reeled in, the bail wire is rotated through approximately 120 degrees to snare the fishing line. The line is reeled in by rotating the reel bowl and reciprocating the spool up and down by means of a crank and an appropriate gear train. The rotating bail wire thereby winds the fishing line uniformly around the reciprocating spool.

A fisherman typically prepares for a cast by grasping the fishing rod in one hand, overlapping the fishing line with the index finger, and releasing the bail wire with the other hand by rotating it approximately 120 degrees to an open position at which it is out of contact with the fishing line. Releasing or opening the bail wire with the other hand constitutes an inconvenience to the fisherman and tends to make this type of reel less competitive than other types which do not employ bail wires.

Accordingly, it is an object of this invention to simplify the control of the bail wire in an open face spinning reel.

This and other objects of my invention are attained in an illustrative embodiment thereof comprising an open face spinning wheel of the general type described above which is attached in a conventional manner to a fishing rod. In accordance with one feature of the inventiotn the bail wire is rotated from its closed to its open position by a trigger lever located adjacent the point of contact of the fishing line with the bail wire. The trigger is conveniently actuated by overlapping the index finger over the fishing line and the trigger simultaneously. By moving the index finger toward the rod the lever is actuated to rotate the bail wire to its open position and the fishing line is simultaneously threaded around the index finger as is required for controlling the fishing line during the casting operation.

The bail wire is mounted on a support wall which is keyed to a gear train that reduces the angular rotation of the trigger lever which is necessary for moving the bail wire to its open position. For example, an angular rotation of the trigger lever through 90 degrees may rotate the bail wire through 120 degrees to its open position as is required for free movement of the fishing line during casting. The bail wire rotation is made against a spring bias on the bail wire that otherwise urges it to the closed position.

Located on an inside face of the bail wire support wall is an approximately cylindrical flange. When the bail wire has been rotated to its open position, a spring-biased latch bar is urged into a slot in the cylidrical flange and thereby locks the bail wire in its open position so that the trigger lever can be released by the fisherman without closure of the bail wire. Included on the stationary hub of the reel is a hub flange which contains a cam on its upper surface. When the fisherman commences the reeling-in operation the latch bar rotates with the reel bowl to make contact with the cam. The cam then pivots the latch bar to remove it from the slot in the cylindrical flange of the bail wire support wall. This releases the lock of the bail wire thereby causing it to rotate back to the closed position as is required for the reeling-in operation. Various other important structural features of the trigger and latch mechanism will be described later.

Located at one end of the bail wire adjacent the trigger lever is a rotatable pulley upon which the fish line is forced during the reeling-in operation. The pulley has a central indentation or groove which secures the fishing line on the pulley and which also ensures that the fishing line will be located adjacent the trigger lever so that the line can be grasped and the trigger lever actuated in a single operation when the next cast is to be made. The pulley has conical ends which fit into conical mountings in the bail wire. The conical mountings flare at slightly larger angles than the conical end surfaces so that the pulley is effectively mounted at two point contacts at its opposite ends for minimal friction. As will become clear later, this type of pulley is particularly advantageous for use with a bail wire of the type which has been described.

These and other objects and features of the invention will be better understood from a consideration of the following detailed description, taken in conjunction with the accompanying drawing, in which:

FIG. 4 is a fragmentary cross-sectional plan view of part of the reel bowl assembly of FIG. 2;

FIG. 5 is a fragmentary cross-sectional side elevation view taken along lines 5—5 of FIG. 4;

FIG. 6 is a fragmentary cross-sectional side elevation view taken along line 6—6 of FIG. 4;

FIG. 8 is an illustration of the view shown in FIG. 5 with the bail wire assembly in an open position;

FIG. 9 is an illustration of the view of FIG. 6 with the bail wire assembly in an open position;

FIG. 10 is a partially cross-sectional fragmentary view of the bail wire head of the device of FIGS. 1 and 2; and FIG. 11 is a cross-sectional view taken along lines 11—11 of FIG. 10.

Figure 2:
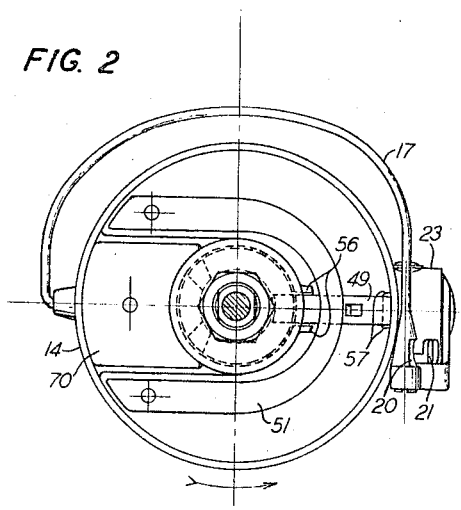
FIG. 2 is a full size plan view of the reel bowl and associated bail wire of the device of FIG. 1.
Figure 3:
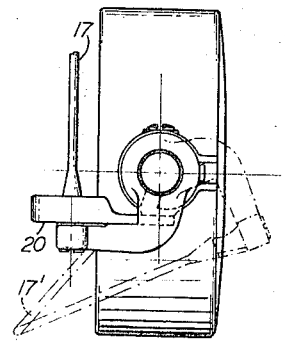
FIG. 3 is a side view of the reel bowl of FIG. 2.
Figure 1:
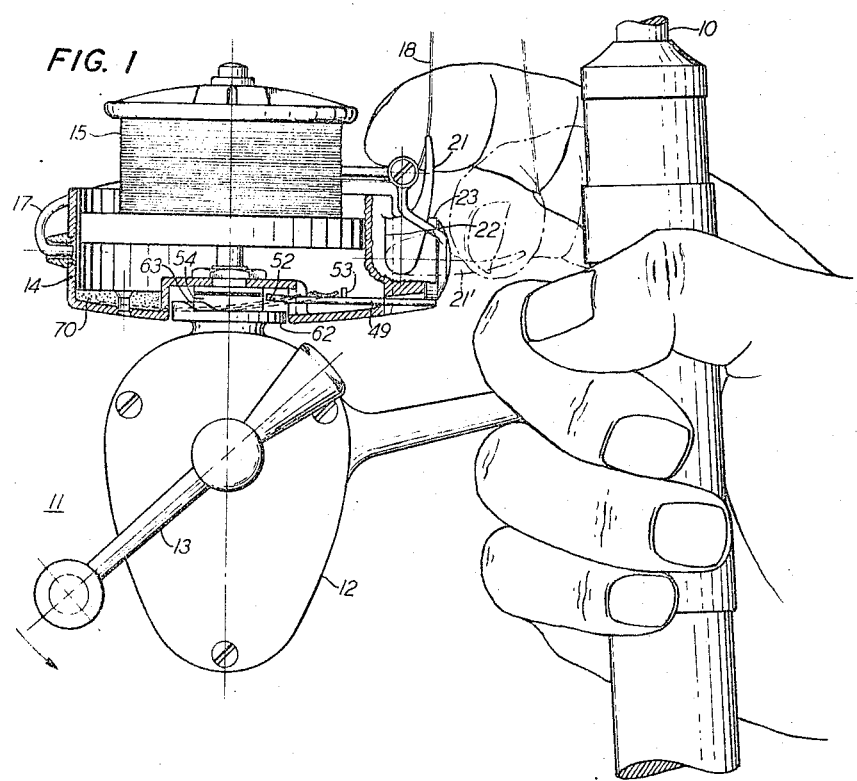
FIG. 1 is a full size partially cross-sectional side elevation view of an open face spinning reel.

Referring now to FIG. 1 there is shown a fishing device comprising a rod 10 having mounted thereon an open face spinning reel 11. The spinning reel includes a gear housing 12, a crank handle 13, a reel bowl 14, and a fishing line spool 15. Rotatably mounted by two bearings on the reel bowl is a stiff semi-circular bail wire 17. A fishing line 18 is wound about the spool 15 in a known manner by rotating the crank handle 13 in the direction shown by the arrow of FIG. 1. Appropriate gear mechanisms in the gear housing 12 then rotate the reel bowl 14 in a counterclockwise direction as shown by the arrow of FIG. 2, and simultaneously cause the spool 15 to reciprocate up and down. During the reeling-in operation, the fishing line 18 is threaded under the bail wire 17 and is therefore guided around the spool 15 as the reel bowl rotates. The reciprocation of the spool 15 distributes the fishing line evenly over its cylindrical surface. Preparatory to casting, the bail wire must be rotated approximately 120 degrees from its closed position shown in FIGS. 1 and 2 to its open position shown in phantom at 17' on FIG. 3. This permits the fishing line 18 to unravel freely from the spool 15 when the cast is made. The gear mechanisms contained within housing 12 to impart the desired motions to spool 15 and reel bowl 14 are well known in the art and will therefore not be described.

Mounted in one end of bail wire 17 is a small roller-type pulley 20, the construction of which is shown more clearly in FIG. 10 and will be more fully described later. The counterclockwise rotation of the reel bowl during the reeling-in operation forces the fishing line onto the pulley 20 where it is held in place by the grooved surface of the pulley. Preparatory to making a cast, it is customary to locate the point of contact of the fishing line with the roller and to overlap the fishing line with the index finger as shown in FIG. 1 in order to control the fishing line during the casting operation. The bail wire 17 is then thrown to the open position as described above. In accordance with the invention, these two operations are accomplished by a single movement of the index finger through the provision of a trigger lever 21 immediately adjacent the pulley 20. By pulling the trigger lever 21 to the position 21' shown in phantom in FIG. 1, the bail wire 17 is rotated to the open position 17' of FIG. 3. Because the fishing line 18 is simultaneously overlapped by the index finger as shown in FIG. 1, the fisherman is prepared to make his cast.

The trigger lever 21 is located on an approximately cylindrical trigger housing 23, shown in detail in FIGS. 4, 5, and 6. As shown in FIG. 6, the housing 23 defines two interior cavities 24 and 25 divided by a central partition 26. Located within cavity 24 is a bevel gear segment 27, while a torsion spring 28 is located within cavity 25. Extending through the bevel gear 27, the partition 26, and the torsion spring 28, is a trigger shaft 29 to which the trigger lever 21 is mounted. Also extending through the partition 26, at right angles with the trigger shaft 29, is a stationary headed spindle 30. Spindle 30 contains a transverse aperture 31 through which the trigger shaft 29 extends. As shown in FIG. 4, a bevel gear 33 is rotatably mounted on the headed spindle 30 in intermeshing relationship with the bevel gear segment 27.

Figure 7:
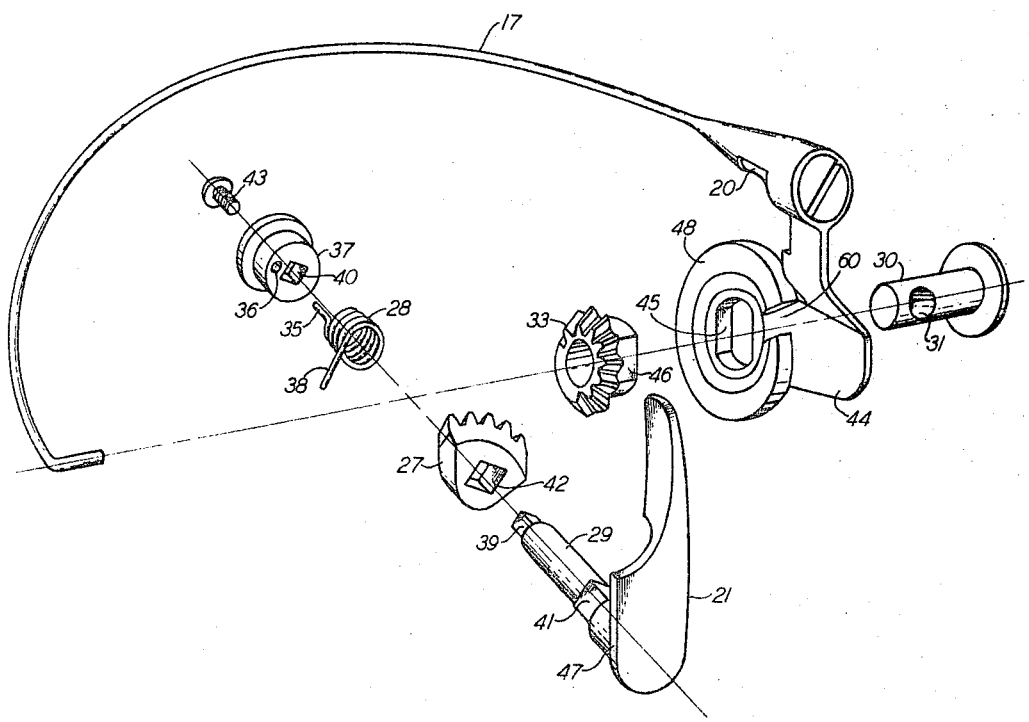
FIG. 7 is an exploded perspective view of a rotating mechanism used in the device of FIGS. 1 and 2.
Figure 1:
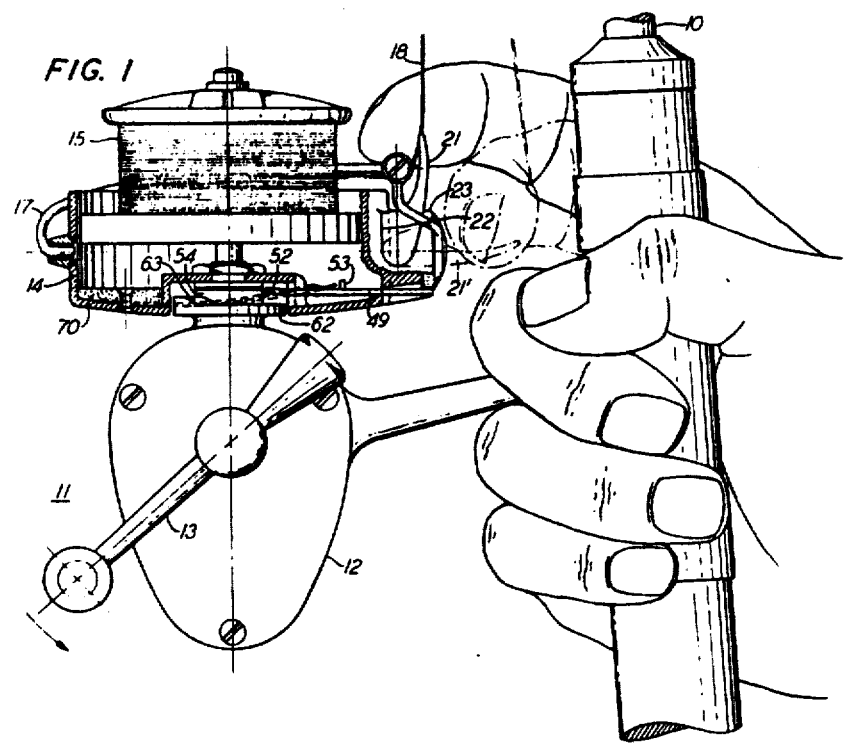

The rotation of the bail wire 17 by operation of the trigger lever 21 can be best appreciated with reference to the exploded view of FIG. 7. The torsion spring 28 has a free end 35 which extends into an aperture 36 of a rotatable retaining sleeve 37. A fixed end 38 of the spring abuts against one wall of the trigger housing 23 as best shown in FIGS. 4 and 6. The trigger shaft 29 has a keyed end portion 39 which fits into a key aperture 40 of the retaining sleeve 37. Another keyed portion 41 near the base of the trigger shaft 29 fits into a key aperture 42 of the bevel gear segment 27. The bail wire 17 is mounted on a support wall 44 containing a key aperture 45 into which a keyed portion 46 of bevel gear 33 is mounted. A screw 43, threaded into the end of spindle 29, locks the construction together.

The torsion spring 28 biases the trigger shaft 29 in a counterclockwise position to force the edge 47 of the trigger lever 21 against the reel bowl stop pad 22 as shown in FIGS. 1 and 9. When the trigger lever is rotated against this spring bias, it rotates bevel gears 27 and 33 thereby rotating the bail wire 17 which is coupled to bevel gear 33 through the support wall key aperture 45. The gear ratio of gear 33 to gear 27 is preferably about 4:3 so that a rotation of 80 to 90 degrees of the trigger lever 21 yields a 120 degree rotation of the bail wire. The 80 to 90 degree rotation of the trigger lever can be conveniently made by the index finger as shown in FIG. 1. Bevel gears 27 and 33 are preferably made of bronze, while the remaining elements of FIG. 7 are preferably made of stainless steel. The reel bowl 14 and the trigger housing 23 may be made of die cast aluminum or a plastic material such as nylon.

Located on an inner face of bail wire support wall 44 is an approximately cylindrical flange 48. When the bail wire is in its closed position, a latch bar 49 abuts against the outer periphery of the flange 48 as it shown in FIGS. 1 and 5. The latch bar pivots on the lower edge of a rectangular aperture 50 in the cylindrical wall of reel bowl 14 and is biased against the flange 48 by a leaf spring 51 which is preferably U-shaped as shown in FIG. 2. The latch bar 49 lies freely in the reel bowl and contains a stop 53 in its mid-portion which abuts against the leaf spring 51 to keep it from rubbing on the reel hub 54. The latch bar is prevented from sliding out of the reel bowl by a pair of shoulders 55 which abut against the reel bowl as shown in FIG. 4. The points of contact of the reel bowl with the latch bar have been reinforced at locations 56 and 57 of FIG. 2 to minimize the effects of wear. As shown in FIG. 6, a pair of ribs 59 on the bottom of the trigger housing guide and support the latch bar in transverse direction.

The purpose of the latch bar 49 is to lock the bail wire 17 in its open position during the casting operation. As is best shown in FIG. 7, the cylindrical flange 48 contains a radial slot 60 with which the latch bar comes into contact when the bail wire is rotated to its full open position. When this happens, the leaf spring 51 forces the latch bar into the slot 60 and thereby prevents the bail wire from returning to its closed position. FIGS. 5 and 6 show the position of the latch bar with the bail wire in the closed position while FIGS. 8 and 9 show its locking action when the bail wire is in the open position. FIG. 5 shows a tapered wall 61 of the trigger housing to permit the latch bar to pivot freely on the edge of aperture 50 and to enter freely the slot 60 as shown in FIG. 8.

As shown in FIG. 1, the reel hub 54 contains a cylindrical hub flange 62. Hub end 52 of the latch bar above the hub flange 62 is preferably bent upwardly slightly as best shown in FIG. 4. When the latch bar moves into its locking position, the leaf spring 51 forces the hub end 52 of the latch bar firmly against the hub flange 62. The hub flange 62 is nonrotatable and so its firm contact with the latch bar prohibits extraneous rotation of the reel bowl 14 during the casting operation. The bent end 52 of the latch bar then lies substantially flush on the upper surface of flange 62 to maximize friction therewith.

Located on the upper surface of the hub flange opposite the trigger mechanism is a tapered cam portion 63, the purpose of which is to automatically release the bail wire during the reeling-in operation. The line is reeled in by turning the crank handle 13 to overcome the friction of the latch bar with the hub flange 62. When the reel bowl has rotated approximately 120 degrees, the latch bar starts to ride upon the inclined surface of the cam portion 63. This pivots the latch bar and lowers its other end out of the slot 60 in the cylindrical flange 48. The end of the latch bar is preferably rounded at points 64, shown in FIG. 4, to keep it from digging into the cam portion 63.

The outer surface of the cylindrical flange 48 is on one side of slot 60 spiraled inwardly toward the slot 60 to form cam portion 65 as is best shown in FIG. 10. The inward curvature of cam portion 65 has been somewhat exaggerated on FIGS. 7 and 10 for purposes of illustration. The latch bar is pivoted by the hub cam portion 63 a sufficient distance only to reach this cam portion 65. At this point, the latch bar no longer abuts firmly against this side of the slot and the spring bias on the bail wire exerted by the torsion spring 28 rotates the bail wire assembly and causes the latch bar to ride up the inclined surface of the cam portion 65. This lifts the hub end 52 from further contact with cam 63. With the latch bar released in this manner the bail wire rotates back to the closed position with the latch bar still abutting firmly against the outer periphery of the cylindrical flange 48 as described above.

The continued reeling-in operation forces the fishing line 18 into the grooved roller pulley 20 as mentioned before. As shown in FIG. 10, the fishing line overlaps the pulley at an angle of only about 90 degees. This localizes the force on the pulley and may result in slippage of the line on the pulley if the pulley bearings are not of such low friction as to allow extremely free rotation. As is shown in FIG. 10, almost point-contact surfaces are attained by making the ends of the pulley in a cone shape. The pulley is mounted between bearing surfaces 66 which are of a cone shape of a slightly larger angle than that of the ends of the pulley. The ends of the pulley are preferably formed at an angle of about 100 degrees while the bearing surfaces 66 extend at angles of about 110 degrees. Durable jewel bearings 67, such as sapphire, are included in the part of the mounting surfaces which make contact with the pulley.

One of the mounting surfaces is defined in an end wall of an adjustable screw 68 which is threaded into a bail wire head portion 69. Minimum friction and play of the pulley 20 is easily attained by threading the screw 68 either toward or away from the pulley 20. As is best shown in FIG. 10, part of the bail wire head portion 69 is cut away in the region of the pulley 20 to allow free movement of the fishing line 18.

Smooth operation of the open-face spinning reel 11 requires that it be in proper balance. For this purpose, a counterweight 70 is included in the reel bowl 14 opposite the trigger housing 23 as shown in FIGS. 1 and 2. Weight 70 counterbalances the weight of trigger housing 23 and its associated elements, and gives the reel bowl 14 a center of gravity that coincides with the central axis of fishing line spool 15. Weight 70 may be secured to the reel bowl by a single screw or by any other appropriate means. With the center of gravity extending through the center of the reel bowl, there is no force acting on the reel bowl to turn it during casting, and the reeling-in operation can be made with a uniform angular force applied to crank 13.

In summary, it can be seen that my invention permits grasping of the fishing line and rotation of the bail wire to the open position by one simple movement of the index finger of the fisherman. The bail wire is locked in the open position even if the trigger lever is released during casting. When the fisherman commences the reeling-in operation the bail wire is automatically returned to its closed position. Reeling in of the line is then made with a minimum amount of friction because of the low-friction adjustably-mounted pulley. A minor advantage of my reel is that the fisherman can continually determine the position of the fishing line during reeling in by letting his index finger ride lightly over the trigger lever as it rotates. In this way he can easily terminate the reeling in when the trigger lever and fishing line is adjacent the rod. This is preferable to the present practice of letting the fishing line strike the index finger during reeling in so that the fishing line can be properly oriented for grasping preparatory to the next cast.

It can be appreciated that various features of the invention may be modified is so desired. For example, the trigger mechanism described does not require for its operation the particular disclosed latching mechanism. Likewise, the particular bail wire pulley described is not required by the trigger mechanism, although it preferably cooperates therewith. Numerous other embodiments and modifications can be made by those skilled in the art without departing from the spirit and scope of my invention.

What is claimed is:
1. A spinning-type fishing reel comprising:
a reciprocable spool;
means for winding a fishing line around the spool comprising a rotatable reel bowl and a bail wire rotatably mounted on the bowl;
means comprising a trigger mechanism for rotating the bail wire between a closed position at which it contacts the fishing line and an open position at which it does not contact the fishing line;
said trigger mechanism comprising a rotatable trigger lever located closely adjacent the point of contact of the fishing line with the bail wire when the bail-wire is in the closed position;
first and second bevel gears;
the first bevel gear being rotatable with the trigger lever;
the second bevel gear being rotatable with the bail wire;
the first and second bevel gears being in intermeshing relationship;
a spring for biasing the bail wire in the closed position, whereby the rotation of the bail wire to the open position is made against said spring bias;
means comprising a latch mechanism for locking the bail wire in the open position;
and means responsive to the rotation of the reel bowl for releasing said latch mechanism, whereby the bail wire is automatically returned to the closed position prior to rewinding of the fishing line about the spool.

2. The fishing reel of claim 1 further comprising:
an approximately cylindrical flange attached to one end of the bail wire and being rotatable therewith;
said latch mechanism comprising a latch bar;
means for biasing the latch bar against the outer periphery of the cylindrical flange when the bail wire is in the closed position; and
a radial slot in the cylindrical flange;
said radial slot being in contact with the latch bar when the bail wire is in the open position, whereby the latch bar biasing means forces the latch bar into the slot and locks the bail wire against rotation back to the closed position.

3. The fishing reel of claim 2 wherein the releasing means comprises a stationary hub flange;
a first end of the latch bar being located opposite one wall of the hub flange;
said latch bar spring forcing the first end of the latch bar against said wall of the hub flange when the bail wire is in the open position;
a raised cam portion on part of the wall of the hub flange;
said latch bar being rotatable with said reel bowl;
and said raised cam portion pivoting the latch bar out of said slot when the reel bowl is rotated with respect to the hub flange.

4. In fishing apparatus of the type comprising a rod having a handle portion adapted to be grasped by the operator, a spinning-type fishing reel mounted at the end of a mounting member which is adapted to extend transversely from the handle portion, a fishing line adapted to extend from the reel in a direction approximately parallel to the rod, the mounting member being of an appropriate length to permit an operator to grasp the handle portion with a hand while simultaneously overlapping the index finger of that hand over the fishing line, said reel comprising a reciprocable spool, a reel bowl that is rotatable about the spool, and a bail wire pivotally mounted at opposite ends to the rel bowl and being rotatable between a closed position at which it ensnares the fishing line and an open position at which it does not contact the fishing line, whereby as the bail wire in the closed position rotates with the reel bowl it forces the fishing line to a first pivoted end of the bail wire, the improvement comprising:
means comprising a trigger mechanism for rotating the bail wire from its closed position to its open position;
said trigger mechanism comprising a rotatable trigger lever mounted on the reel bowl adjacent the first end of the bail wire, extending therefrom in the same direction as the fishing line, and being partially coextensive with the fishing line when the fishing line has been forced to the first pivoted end of the bail wire, whereby the the extended index finger of the operator may terminate the rotation of the reel bowl by intercepting the trigger lever and may simultaneously overlap the fishing line and rotate the trigger lever;
the trigger mechanism further including a linkage mechanism coupling the trigger lever to the bail wire for rotation of the bail wire in response to rotation of the trigger lever.

5. A spinning fishing reel comprising:

a reciprocable spool;

means for winding a fishing line around the spool comprising a rotatable reel bowl and bail wire;

means comprising a trigger mechanism for rotating the bail wire between a closed position at which it contacts the fishing line and an open position at which it does not contact the fishing line;

said trigger mechanism comprising a rotatable trigger lever mounted on the reel bowl and located closely adjacent the point of contact of the fishing line with the bail wire when the bail wire is in the closed position, whereby the index finger of an operator may simultaneously grasp the fishing line and rotate the trigger lever;

said trigger lever being coupled through a linkage mechanism to the bail wire;

a spring for biasing the bail wire in the closed position, whereby rotation of the bail wire to open position is made against said spring bias;

means comprising a latch mechanism for locking the bail wire in the open position;

and means responsive to the rotation of the reel bowl for releasing said latch mechanism, whereby the bail wire is automatically returned to the closed position prior to rewinding of the fishing line about the spool.

References Cited

UNITED STATES PATENTS

| 1,503,713 | 8/1924 | Sanders | 242—157 |
| 2,498,987 | 2/1950 | Duncan | 242—84.21 |
| 2,586,921 | 2/1952 | Delphon | 242—84.21 |
| 2,658,697 | 11/1953 | Steinbaugh | 242—84.21 |
| 2,713,463 | 7/1955 | Sarah | 242—84.21 |
| 3,045,942 | 7/1962 | Henz | 242—84.21 |

FOREIGN PATENTS 498,460  1/1939  Great Britain.

STANLEY N. GILREATH, *Primary Examiner.*

REEXAMINATION CERTIFICATE (1579th)
United States Patent [19]
Brantingson

[11] B1 3,342,442
[45] Certificate Issued  Oct. 29, 1991

[54] FISHING REEL

[75] Inventor: Sigurd Brantingson, Short Hills, N.J.

[73] Assignee: Sigurd Brantingston, Jr.

Reexamination Request:
No. 90/002,082, Jul. 5, 1990

Reexamination Certificate for:
Patent No.: 3,342,442
Issued: Sep. 19, 1967
Appl. No.: 424,645
Filed: Jan. 11, 1965

[51] Int. Cl.$^5$ .......................................... A01K 89/01
[52] U.S. Cl. .................................................. 242/233
[58] Field of Search ........................ 242/231, 232, 233

[56] References Cited
U.S. PATENT DOCUMENTS

| | | | |
|---|---|---|---|
| 1,503,713 | 8/1924 | Sanders | 242/157 R |
| 2,498,987 | 2/1950 | Duncan | 242/232 |
| 2,586,921 | 2/1952 | Delphon | 242/228 |
| 2,658,697 | 11/1953 | Steinbaugh | 242/233 |
| 2,713,463 | 7/1955 | Sarah | 242/242 |
| 3,045,942 | 7/1962 | Henze | 242/233 |
| 3,233,845 | 2/1966 | Inamura | 242/233 |

FOREIGN PATENT DOCUMENTS

| | | |
|---|---|---|
| 994094 | 11/1951 | France . |
| 36-6477 | 4/1961 | Japan . |
| 39-36327 | 4/1964 | Japan . |

*Primary Examiner*—Katherine Matecki

[57] ABSTRACT

A spinning-type fishing reel comprising:
  a reciprocable spool;
  means for winding a fishing line around the spool comprising a rotatable reel bowl and a bail wire rotatably mounted on the bowl;
  means comprising a trigger mechanism for rotating the bail wire between a closed position at which it contacts the fishing line and an open position at which it does not contact the fishing line;
  said trigger mechanism comprising a rotatable trigger lever located closely adjacent the point of contact of the fishing line with the bail wire when the bail-wire is in the closed position;
  first and second bevel gears;
  the first bevel gear being rotatable with the trigger lever;
  the second bevel gear being rotatable with the bail wire;
  the first and second bevel gears being in intermeshing relationship;
  a spring for biasing the bail wire in the closed position, whereby the rotation of the bail wire to the open position is made against said spring bias;
  means comprising a latch mechanism for locking the bail wire in the open position;
  and means responsive to the rotation of the reel bowl for releasing said latch mechanism, whereby the bail wire is automatically returned to the closed position prior to rewinding of the fishing line about the spool.

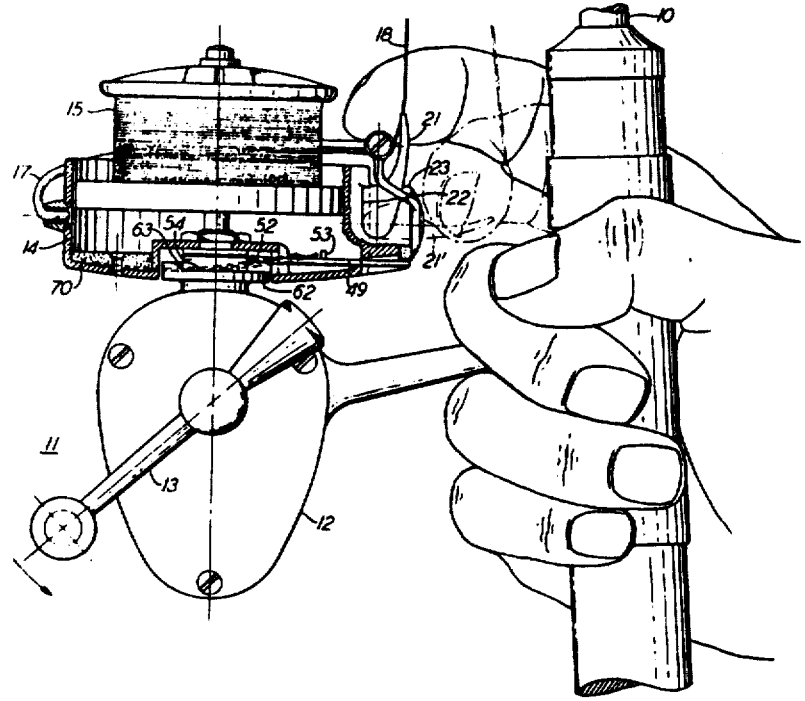

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-3 is confirmed.

Claims 4 and 5 are cancelled.

* * * * *